US005481943A

United States Patent [19]

Kraeutler

[11] Patent Number: 5,481,943

[45] Date of Patent: Jan. 9, 1996

[54] SAFETY DEVICE AGAINST RUPTURE OF A ROTARY SHAFT

[75] Inventor: Bernard Kraeutler, Dunieres, France

[73] Assignee: Nergeco (Societe Anonyme), Dunieres, France

[21] Appl. No.: 96,269

[22] Filed: Jul. 26, 1993

[30] Foreign Application Priority Data

Jul. 29, 1992 [FR] France .................................. 92 09391

[51] Int. Cl.[6] ................................ F16P 7/02; E06B 9/80

[52] U.S. Cl. ............................ 74/609; 160/291; 160/300

[58] Field of Search .......................... 74/609; 192/129 R, 192/133, 135; 160/291, 300, 23.1; 464/160; 188/265, 82.77; 248/251, 261

[56] References Cited

U.S. PATENT DOCUMENTS

| | | | |
|---|---|---|---|
| 162,564 | 4/1875 | Judd | 160/297 |
| 169,822 | 11/1875 | Mathers | 160/300 |
| 4,932,456 | 6/1990 | Buxbaum | 160/300 |

FOREIGN PATENT DOCUMENTS

| | | |
|---|---|---|
| 2608006 | 4/1977 | Germany . |
| 3300331 | 5/1984 | Germany . |
| 3608467 | 9/1987 | Germany . |
| 2142366 | 1/1985 | United Kingdom . |

*Primary Examiner*—Rodney H. Bonck
*Assistant Examiner*—Troy Grabow
*Attorney, Agent, or Firm*—Sughrue, Mion, Zinn, Macpeak & Seas

[57] ABSTRACT

A safety device used in case of rupture of a rotary shaft for preventing the shaft from rotating and for preventing broken portions thereof from falling, includes at least one safety element placed so as to retain the shaft to prevent it from falling. The peripheral surface of the shaft and a facing surface of the safety element are provided with mating devices that cooperate to prevent the shaft from rotating when a portion of the shaft is retained by said safety element due to the shaft rupturing. The device is particularly suitable for use with a shaft that winds up lifting straps for a raisable curtain or that winds up the curtain itself.

12 Claims, 2 Drawing Sheets

SAFETY DEVICE AGAINST RUPTURE OF A ROTARY SHAFT

BACKGROUND OF THE INVENTION

1. Field of the Invention

The present invention relates to a safety device against rupture of a rotary shaft. In particular, the present invention relates to a device intended to stop shaft rotation and to prevent broken portions of the shaft from falling. The invention is particularly suitable for the wind-up shafts of raisable curtain doors, wherein the shaft winds up a flexible curtain of cloth or plastics materials directly or wherein the shaft winds up straps which in turn serve to raise the curtain which may, itself, be formed of panels that are rigid or flexible and that are suitable for folding up above the doorway.

2. Discussion of Related Art

Doors which are used in factories and warehouses often have to operate under difficult conditions. For example, they may be required to operate several hundreds or even thousands of times a day, resulting in sudden starting and stopping of the door components. Operation of the door may be interrupted roughly in the event of accidents, shocks, etc. It can happen that a wind-up shaft breaks. Not only may the pieces of the broken shaft fall to the ground, thus constituting a first danger, but also, since the shaft is broken, one of the parts thereof is no longer braked, and since it is thus free to rotate it will necessarily allow any door portions such as straps or curtains that were previously supported to unwind, thus causing the curtain to be unwound on one side. This gives rise to further risks of parts falling. In addition, it also gives rise to the risk that the curtain will tear or be damaged in some other way.

SUMMARY OF THE INVENTION

The object of the present invention is to provide a safety device against rupture of a rotary shaft for preventing the shaft from rotating and for preventing broken portions thereof from falling, the device being particularly suitable for use with a shaft that winds up lifting straps for a raisable curtain or that winds up the curtain itself. This and other objects, features and advantages of the present invention are provided by a safety device wherein at least one safety element is placed to thereby retain the shaft so as to prevent it from falling, and wherein the peripheral surface of the shaft and the facing surface of said safety element are provided with means cooperating with the shaft for preventing the shaft from rotating when a portion of the shaft is retained by said safety element due to the shaft rupturing.

In one embodiment, the safety element is a bracket surrounding the bottom portion of the shaft, the inside of the bracket is provided with members in relief, e.g., at least one rib. The surface of the shaft is also provided with members in relief, e.g., at least one longitudinal groove suitable for engaging said rib to be locked thereagainst.

BRIEF DESCRIPTION OF THE DRAWING

Other characteristics and advantages of the invention appear from the following description of an embodiment of the invention given by way of non-limiting example and described with reference to the accompanying drawing, which show clearly how the invention can be implemented. In the drawing.

DETAILED DESCRIPTION OF THE PREFERRED EMBODIMENTS

Figure 1:
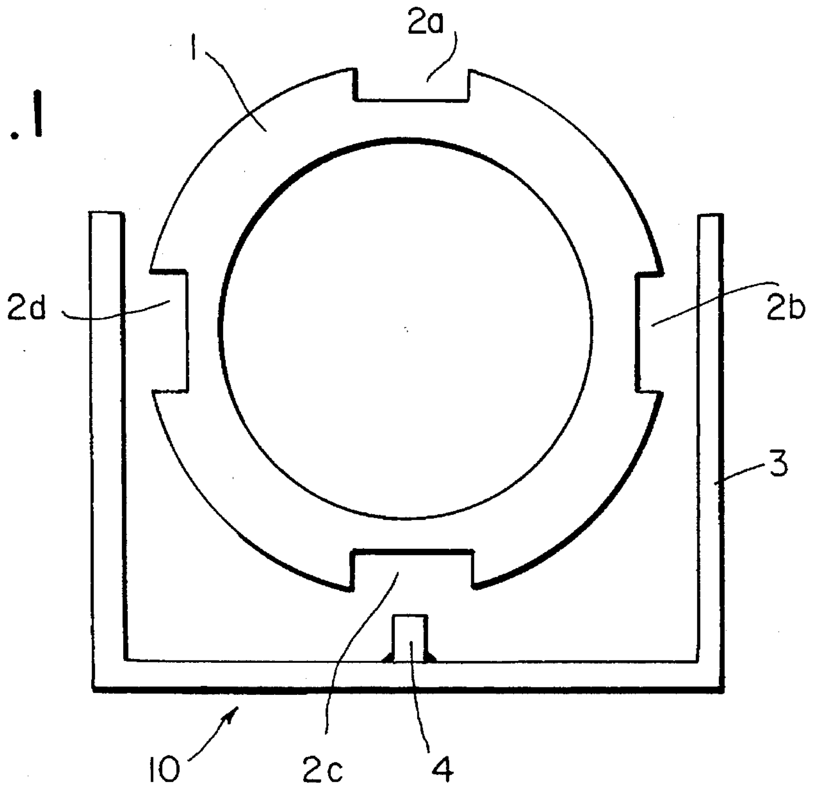
FIG. 1 is a sectional view through a mechanism in normal operation, the mechanism comprising a wind-up shaft of the invention, and the section being taken through a safety element.

FIG. 1 shows a mechanism in normal operation, which includes a shaft 1 formed by means of a hollow tube that includes, at least at certain locations therealong, longitudinal grooves *2a*, *2b*, *2c*, and *2d* that have no effect in normal operation. At the locations corresponding to these portions in relief, safety elements 10 are disposed beneath the shaft. Advantageously, they may be constituted by brackets 3 fitted with at least one respective rib 4, e.g., in the bottommost portion of the bracket 3. The section of the grooves and of the ribs are designed to lock the shaft against rotation should it come to bear against the bottom of a bracket. These portions in relief are therefore made with sharp angles, e.g., 90° angles. Alternatively, the shaft could be provided with ribs instead of being provided with grooves.

Figure 2:
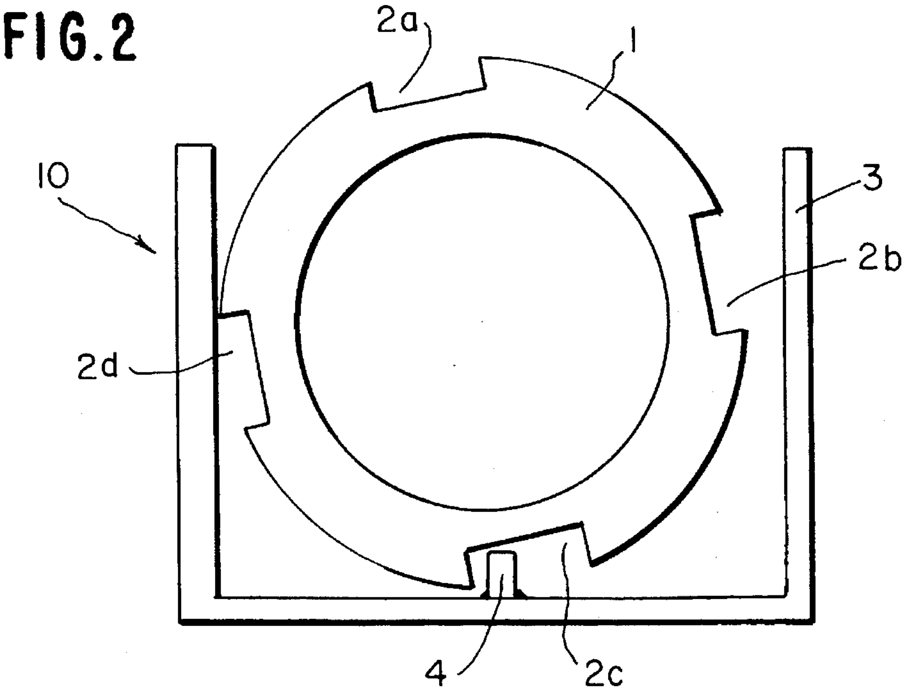
FIG. 2 is a sectional view through the same elements after a raisable curtain door has broken.

FIG. 2 shows the same portion of the shaft 1 after the shaft 1 has broken. Since the shaft is no longer continuous, it drops, generally being held by joints at its ends. It can clearly be seen from the drawing that the broken shaft 1 does not fall to the floor, but is supported by the bracket 3, which is itself fixed to the door frame. In addition, the shaft is prevented from rotating. Thus, in the event of rupture, nothing falls down, and the broken shaft is immediately prevented from rotating.

It will be appreciated that the shaft may have the section shown along its entire length.

The safety element 10 may extend along the entire corresponding length, thus having the overall shape of a gutter. This disposition is suitable for shafts that wind up lifting straps, since large fractions of the shaft remains uncovered.

When the curtain itself winds onto the shaft, the above-described safety dispositions can be applied only to the ends of the shaft beyond the region of the shaft onto which the curtain is wound. Under such circumstances, other embodiments of the safety device are possible.

Figure 3:
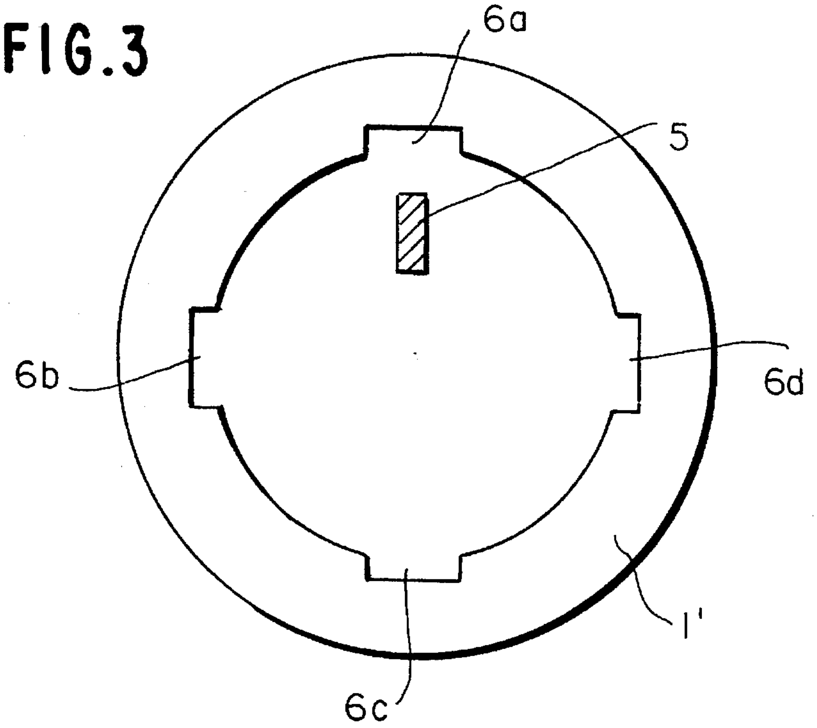
FIG. 3 is a sectional view through a variant embodiment according to the present invention.
Figure 4:
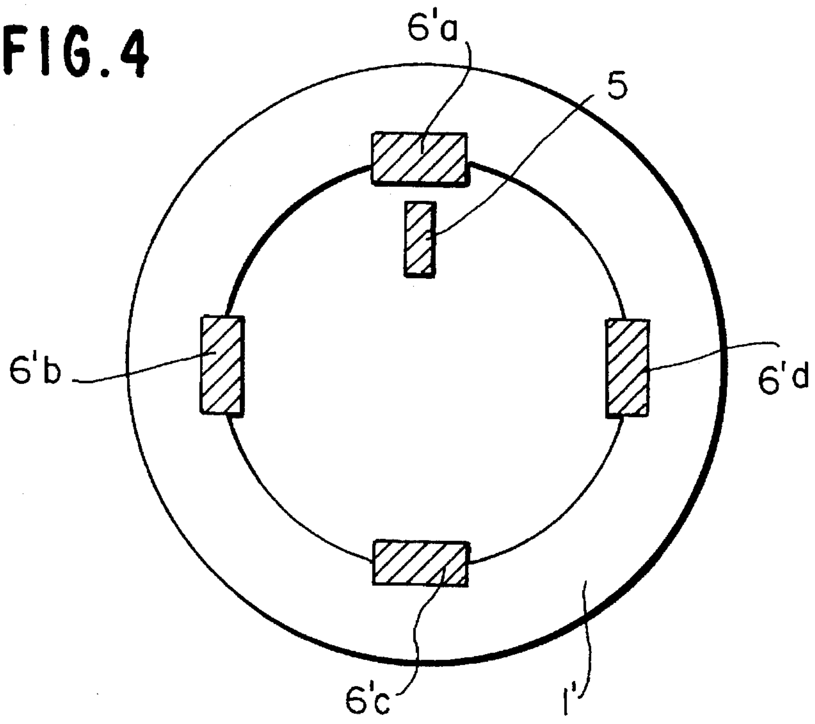
FIG. 4 is a sectional view through another variant embodiment according to the present invention.

FIG. 3 shows a variant in which the safety element is a rod 5 engaged inside the shaft 1'. Four notches *6a* to *6d* are formed in the inside periphery of the shaft, facing the rod 5. The section of the rod 5 advantageously has sharp angles so as to prevent the shaft from rotating should it come to rest thereon. The notches *6a* to *6d* could be replaced by ribs, as shown in FIG. 4.

Naturally, other shapes of relief could be adopted, the essential points being:

1 - a length of broken shaft must be retained so as to prevent it from falling to the ground; and 2 - it must be prevented from rotating.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

I claim:

1. A safety device operable in the event of rupture of a rotary shaft for preventing the shaft from rotating and for preventing broken portions of the shaft from falling, for use with a shaft that winds up one of lifting straps for a raisable curtain and the curtain itself, characterized in that at least one safety element is placed below and along a substantial portion of the shaft to retain the shaft to prevent it from falling, wherein a peripheral surface of the shaft and a facing surface of said safety element comprise means for cooperatively preventing the shaft from rotating when a portion of the shaft is retained by said safety element due to the shaft rupturing.

2. The device according to claim 1, wherein the safety element comprises a bracket surrounding the bottom portion of the shaft, an inside of the bracket being provided with a first member and the surface of the shaft also being provided with a second mating member suitable for engaging said first member to thereby lock said shaft.

3. The device according to claim 2, wherein said second mating member comprises at least one longitudinal slot and wherein said first member comprises a rib disposed substantially parallel to said longitudinal slot.

4. Device according to claim 1, wherein said shaft is a hollow shaft, wherein the safety element is a rod disposed inside the hollow shaft, the inside peripheral wall of said hollow shaft including a mating member for engaging with said rod so as to prevent shaft rotation.

5. The device according to claim 4, wherein said mating member comprises at least one rib protruding from said inside peripheral wall of said hollow shaft.

6. A safety element for a roll up door including a shaft suspended above a door way, said safety element comprising:

first means disposed parallel to the length of the shaft for supporting the shaft in the event of a shaft rupture, which rupture thereby moves a ruptured portion of the shaft into contact with said first means; and second means for preventing rotation of said ruptured portion of the shaft when the ruptured portion of the shaft moves into contact with said first means.

7. The safety element as recited in claim 6, wherein said first means comprises a bracket disposed beneath said shaft.

8. The safety element as recited in claim 6, wherein said second means comprises:

a first member operatively supported beneath said shaft;

a second mating member connected to said shaft and opposing said first member for engaging said first member when said ruptured shaft is moved into contact with said first means.

9. The safety element as recited in claim 8, wherein said first member is a male member and wherein said second mating member is a female member.

10. The safety element as recited in claim 8, wherein said first member is a male member and wherein said second mating member is a male member.

11. The safety element as recited in claim 6, wherein said shaft is a hollow shaft, wherein said first means is a rigid rod member, and wherein said rod member is disposed inside of said hollow shaft.

12. The safety element as recited in claim 11, wherein said second means comprises:

said rod member;

a mating member provided on an inside surface of said hollow shaft, said mating member being brought into engaging contact with said rod member when said ruptured shaft is moved into contact with said first means.

* * * * *